| I | II | III |
|---|---|---|
| Turbid Water | Taconite Slurries | Carbon Slurries |
| Hard Water | Steel Mill Waste Slurries | Coal Slurries |
| Uranium Ore Slurries | Coal Slurries | Magnesia Slurries |
| Copper Ore Slurries | Silica Slurries | Silica Slurries |
| Aluminum Hydroxide Slurries | Aluminum Hydroxide Slurries | Impure Sugar Solutions |
| Iron Oxide Slurries | | Brine Solutions |
| Potash Slurries | | Caustic Solutions |
| Kaolin Slurries | IV | V |
| Tin Slurries | Magnesia Slurries | Kaolin Slurries |
| Borax Slurries | Coal Slurries | |
| Dyestuff Waste | Sewage Waste Waters | |
| Glass Polishing Waste | Impure Sugar Solutions | |
| Steel Mill Waste Slurries | Kaolin Slurries | |

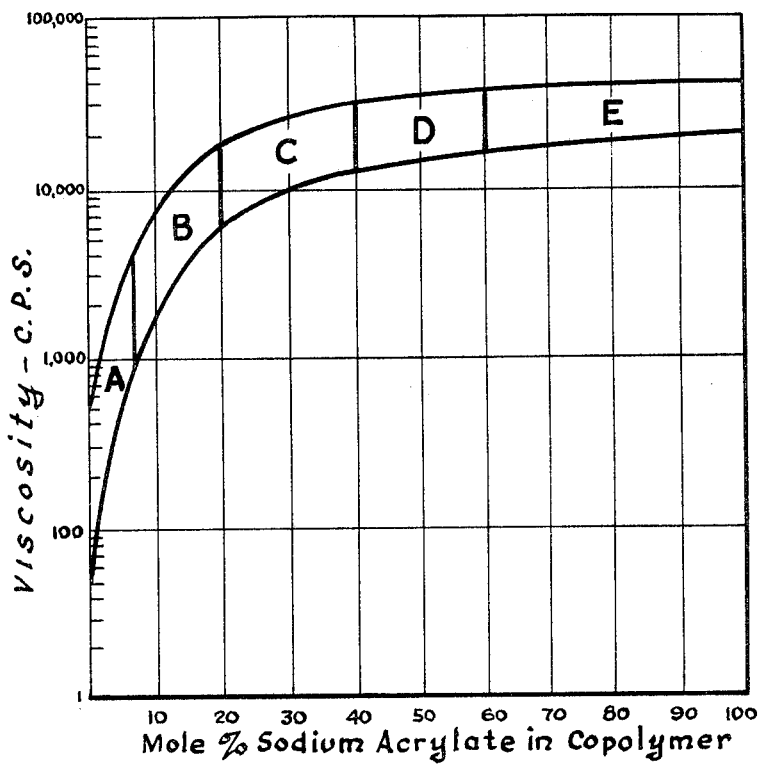

Inventors
Walter M. Chamot
John T. Burke

By Margall, Johnston, Cook & Root
Attorneys

United States Patent Office 3,479,282
Patented Nov. 18, 1969

3,479,282
METHOD OF FLOCCULATING SUSPENDED SOLIDS USING COPOLYMERS AS FLOCCULATING AGENTS
Walter M. Chamot, Brookfield, and John T. Burke, La Grange, Ill., assignors to Nalco Chemical Company, Chicago, Ill., a corporation of Delaware
Filed July 1, 1964, Ser. No. 379,665
Int. Cl. B01d *21/01*
U.S. Cl. 210—54
6 Claims

ABSTRACT OF THE DISCLOSURE

An optimum method of separating suspended particles in aqueous liquids through the use of acrylamide-acrylic acid salt copolymers. The copolymers used in a given suspended particle aqueous system are defined by their mole percent of sodium acrylate in the copolymers. Specific copolymers having a specific mole percent sodium acrylate content are found to be more efficient in certain suspended particle aqueous systems as flocculating additives.

---

The instant invention relates to copolymeric substances employed as flocculating additives. More specifically, the present invention is concerned with acrylamide-acrylic acid salt copolymers of varying types which are usefully employed in flocculating a wide variety of aqueous liquids.

A number of substances have been discovered as useful promoters of coagulation of flocculation of suspended solids in aqueous media. Among these, one of the most successful classes is high molecular weight organic polymers. Within this class a number of copolymeric materials have shown promise. However, it has been discovered that in many special coagulation processes, employment of a specifically tailored copolymer is necessary. That is, for best results, one must use a copolymer of a certain chemical character, such as one synthesized from a certain fixed ratio of one monomer to the other. These copolymeric substances, while useful in one or a few coagulation applications, oftentimes show only minimal effects in flocculating other different aqueous systems.

It would be a distinct advantage to the art if a single class of copolymeric materials were discovered which would show activity in a wide variety of aqueous liquids requiring purification or separation of suspended solids. Specifically, if some means were devised to provide a predictable way of choosing specific copolymers falling within the broad spectrum of a copolymeric class, whereby optimum coagulation efficiency is achieved for the particular aqueous liquid so treated, a considerable advance in the coagulation art would be realized. That is, if some way were devised of optimizing coagulation activity among the numerous classes of aqueous waters to be treated, by selecting a specific copolymer from among a generic copolymer class, such concept would become a useful tool in the coagulation field.

It, therefore, becomes an object of the invention to provide copolymeric materials, and their method of use as flocculating agents.

A more specific object of the invention is to provide a number of acrylamide-acrylic acid salt copolymers which may be used for treatment of a wide variety of aqueous liquids, the selection of which particular copolymeric additive depends upon the particular liquid to be treated.

Yet another object of the invention is to provide acrylamide-acrylic acid salt copolymers which may be used in a whole host of coagulation applications with optimum results by proper selection of the particular copolymer which is most efficient in the specific application.

Other objects will appear hereinafter.

In accordance with the invention a new group of copolymeric substances has been discovered which possess remarkable utility as flocculants in a wide variety of aqueous liquids. Specifically, it has been found that acrylamide-acrylic acid salt copolymers may be usefully employed to coagulate or flocculate suspended solids in impure aqueous liquids whereby optimum separation of the liquid phase from solid particles suspended therein is achieved. Most importantly, however, it has been determined that specific aqueous liquids may be coagulated efficiently only with use of copolymers of requisite molecular weight, as measured in terms of viscosity of aqueous solutions, and possessing specific proportions of carboxylate to amide groups. That is, particular classes of aqueous liquids are only efficiently coagulated by certain groups of copolymers having certain ratios of starting monomer content of acrylic acid salt to acrylamide, as well as a definite molecular weight range. Copolymers falling without these molecular weight ranges and specific monomer ratios exhibit poor coagulating activity with respect to the specific aqueous liquid under treatment, and often are wholly ineffective.

For a better understanding of the invention, attention of the reader is drawn to FIG. 1 and FIG. 2. The graph contained in FIG. 1 has been drawn by plotting viscosity of 1% aqueous solutions of copolymers, as measured in terms of centipoises, versus mole percent of sodium acrylate in the acrylamide-acrylate copolymer. Areas within the graph designated as A, B, C, D, and E define the 5 classes of copolymeric substances, as particularly distinguished by the terms of the ordinate and abscissa of the graph. FIG. 2 sets out five specific groups of aqueous liquids designated as Groups I, II, III, IV and V. It has been discovered that, surprisingly enough, only certain combinations of treatments of specific aqueous liquids with specific copolymeric compositions give adequate coagulation results whereby a practical method of separation of suspended solids from the liquid phase is achieved. More specifically, it has been found that the aqueous liquids listed as Group I may be efficiently coagulated only by copolymers falling within and defined by the area designated as Area A. Likewise, the following listed combinations of groups of aqueous liquids and classes of copolymers, as defined by certain areas on the graph give, by far, the best coagulation results: Group II—Area B; Group III—Area C; Group IV—Area D; and Group V—Area E.

The instant invention has much merit in that one can now predict, after learning what aqueous liquid is to be treated, exactly what copolymers in terms of molecular weight and respective monomer proportions of acrylic acid salt to acrylamide must be employed as treatment aids in coagulating the impure liquid. In some few cases, the specific liquid may be usefully and efficiently coagulated by copolymeric compositions falling within more than one area on the graph. For example, it is noted that aluminum hydroxide slurries are most efficiently coagulated by copolymers falling within both Areas A and B. Likewise, kaolin slurries may be coagulated by copolymers falling within each of Areas A, E, and D.

In order to carry out the invention, once it has been established which particular type of water is to be treated, it is only necessary to pick out a specific copolymer as a coagulant, having the requisite molecular weight and monomer proportions as falling within one or more of the designated areas on the graph of FIG. 1. The aqueous liquid is then treated (by conventional coagulation processes) with a material falling within the proper area which defines its physical and chemical characteristics. Generally, the impure water being treated is mixed with a dilute aqueous solution of the organic compolymeric coagulant which promotes agglomeration of the suspended particles until a visible floc is formed. This floc is then separated from the aqueous phase by conventional means such as filtration, settling, centrifugation, etc., techniques. The resultant solid floc material, after separation from the suspending aqueous phase, may be discarded or, in some cases, being the desired component of the separation, is utilized. To achieve the desired coagulation, it is necessary to add at least a coagulating amount of the chosen copolymer. Generally, best results are achieved by addition to the specific impure aqueous liquid being treated of a copolymeric coagulant composition in amounts ranging from 0.1 p.p.m. to about 3,000 p.p.m. More preferably, from about 1 p.p.m. to about 1000 p.p.m. of coagulant additive is employed.

By the term "flocculation" then is meant a process of agglomerating solid particles suspended in aqueous liquid whereby larger solid masses are achieved which can be conveniently separated from the aqueous liquids under treatment.

The aqueous liquids set out in FIG. 2 are well-known liquid solutions or slurries which need little further elaboration. However, in a few instances some further discussion is needed. Specifically, by the term "turbid water" is meant an aqueous liquid containing less than 0.1% suspended solids. These solids are predominantly inorganic in nature and may be present in impure aqueous liquids in amounts ranging as low as 0.0015% by weight of the suspension. Also, by the term "hard water" is meant water containing hardness constituents and usually calcium and magnesium ions. These waters are best defined in terms of alkaline earth metal content. Generally, these hard waters contain at least 100 p.p.m. of alkaline earth metals, expressed as calcium carbonate, and may contain as high as 1500 p.p.m. Usually, the coagulant is used in conjunction with a lime soda softening process. In such a process, water containing hardness components such as calcium and magnesium are treated with lime or lime soda to form insoluble calcium and magnesium carbonates or hydroxides which are then settled out by means of coagulants and subsequently separated. Also, by the term "impure sugar solutions" is meant aqueous solutions containing dissolved sugars and water-insoluble suspended impurities. By the use of the phrase "coal slurries" is meant to include aqueous liquids containing suspended coal particles as well as aqueous liquids containing suspended matter such as clay, silica, etc., as may be found in water resulting from the washing of coal. "Sewage waste water" includes both municipal and domestic wastes as well as industrial waste waters. Lastly, by the phrase "brine solutions" is meant sodium and calcium chloride salt solutions and mixtures thereof which additionally contain suspended impurities.

It is not exactly understood why certain specific aqueous liquids require treatment involving copolymers of a specific molecular weight range and range of proportions of acrylic acid salt monomer to acrylamide monomer. It is known that those polymers containing a greater majority of amide groups have a tendency to coil, while those polymers containing increasing amounts of carboxylate groups tend to extend out in a more linear chain. It is believed that, depending upon the type of particles suspended in the aqueous liquid, most efficient coagulation is achieved with polymers of requisite molecular weight range, and proportion of amide to carboxylate groups. It is generally felt that those polymers having a greater proportion of amide groups tend to adhere more tenaciously to the solid particles than do corresponding polymers having a greater number of carboxylate groups. Certain solid particles in suspension require polymers containing more amide content in order to "stick" together. In other situations, a long linear chain is essential in order to most efficiently coagulate specific suspended particles. Thus, more carboxylate groups on the backbone of the polymer are necessary. The same situation is true with respect to molecular weight ranges. In some instances a relatively low molecular weight polymer gives best results, while in treatment of other suspended particles a high molecular weight polymer is requisite. It is understood, of course, that the invention is not limited by the above theory which is merely meant as an aid to an understanding of the mechanism of the process of the invention.

In order to prepare a copolymer tailored to fit the particular needs of the aqueous liquid under treatment, it is only necessary to adjust at the beginning of the polymerization the monomer ratio and carry out said reaction until the requisite molecular weight range is achieved. The copolymers of the invention falling within Areas A through E may be produced by conventional methods. Generally, a solution-type polymerization is effected. In its broadest aspects, such process may be effected by dissolving acrylamide monomer and acrylic acid in the proper desired proportions, and subsequently neutralizing the acrylic acid present in solution with requisite amounts of base such as caustic. The acrylic acid salt is then formed in situ. On the other hand, acrylic acid salt may be formed outside the reaction vessel and merely added to the acrylamide monomer in salt form. Preferred acrylate salts include the alkali metal salts of acrylic acid, and the ammonium acrylate salt. The most preferred acrylic acid salt monomers as starting materials are sodium acrylate and ammonium acrylate. Of these, the most preferred is sodium acrylate. After solubilization of proper monomer ratio copolymerization is then effected by conventional means. A preferred method of preparing the copolymers of the invention is disclosed in a copending application, Ser. No. 132,562, filed Aug. 21, 1961, now U.S. Patent Number 3,278,506.

It has been determined that the same phenomenon of requirement of specific copolymers depending on the liquid under treatment is present whether the acrylate salt is the sodium salt or any other water-soluble acrylic acid monomer salt. That is, copolymeric products formed by any water-soluble acrylic acid salt monomer and acrylamide monomer are most efficient in coagulation activity if they are specifically tailored, based upon monomer ratio and molecular weight range, for treatment of any one of the Groups I through V by addition of copolymers defined by Areas A through E respectively. Though the particular graph in FIG. 1 is defined in terms of ratio of acrylamide to sodium acrylate, the same areas relating to treatment of the same groups of FIG. 2, as outlined therein, holds true if the sodium acrylate is any water-soluble acrylic acid salt monomer.

Representative copolymeric compositions falling within Areas A through E, as mentioned above, may be formed by a wide variety of different polymerization techniques. The following examples illustrate preparation of a representative copolymer falling within each of the areas of the graph of FIG. 1.

Example I

This example illustrates preparation of a copolymer comprising 95 mole percent acrylamide and 5 mole percent sodium salt of acrylic acid. The product copolymer falls within Area A of the graph. Compositions falling within this area are employed to coagulate the aqueous liquids of Group I.

To 28.87 pounds of soft water was added 0.99 pound of acrylic acid. The acid monomer was thoroughly dissolved in the water and then neutralized with 1.14 pounds of a 50% sodium hydroxide solution until a pH of 7.0–8.5 was reached. The neutralization was effected at a solution temperature below 35° C. 19.00 pounds of acrylamide was then dissolved in the above monomer solution by heating the solution with steam to 25° C. The monomer solution pH was then adjusted to 8.5. Finally, 81 cc. of a 1% solution of potassium persulfate was added to the monomer solution, and mixed thoroughly. 324 cc. of a 1% solution of sodium metabisulfite was also added and mixed into the reaction solution.

The above monomer solution was then added to a reactor containing 127.5 pounds of toluene and 4.35 pounds of sorbitan monooleate non-ionic emulsifier. The reaction mixture was heated to 70° C. and then blanketed with nitrogen after atmospheric air had been purged. The polymerization reaction itself was carried out at 70–75° C. and allowed to proceed until the exotherm had ceased. Twenty minutes after the exothermic reaction was terminated, 18 grams of azobisisobutyronitrile catalyst dissolved in toluene was added to the reaction mixture at 70° C. The nitrogen purge was continued until a second exothermic reaction was completed. This occurred approximately 30 minutes after the azobisisobutyronitrile catalyst was added. Finally, water was removed by azeotropic distillation and the solid product removed from the reactor which, after washing, was ready for use. A 1% solution of this product had a viscosity of 1600 cps. Almost complete reaction took place, since less than about 1.5% unreacted monomer concentration was present at termination of the reaction.

Example II

This example illustrates a typical preparation of a copolymer falling within Area B. Compositions of this type are useful for coagulating aqueous members of Group II. The copolymeric product contained 85 mole percent acrylamide and 15 mole percent sodium salt of acrylic acid.

27 parts of acrylic acid were dissolved in 72 parts of water. 56 parts by weight of a 50% solution of sodium hydroxide were added to the acrylic acid solution at a temperature below 35° C. The pH of the solution at this point was approximately 7–9. 153 parts by weight of acrylamide were then added to the solution and mixed until thoroughly dissolved at a temperature of 20–30° C. 72 parts of additional water were added and the monomer pH adjusted to approximately 8.5. In the reaction vessel itself, 575.0 parts by weight of toluene and 19.6 parts by weight of sorbitan monooleate were dissolved and heated to 70° C. 7.8 parts of a 1% aqueous solution of potassium persulfate were added with stirring to the monomer solution. This was followed by addition of 3.2 parts of a 1% solution of sodium metabisulfite. The monomer solution containing the above redox catalyst system was added to the toluene solution and temperature increased to 75° C. The atmosphere above the reaction vessel was purged with nitrogen and an exothermic reaction then took place. After the exothermic reaction ceased, the mixture was cooled to 63° C. While still under a nitrogen purge, 15.6 parts of a 1.15% solution of azobisisobutyronitrile in toluene was added to the reaction mixture. The nitrogen purge was continued at 63° C., until another exothermic reaction was completed. The completion of this second exothermic reaction occurred approximately 30 minutes after its initiation. Water was then distilled out of the reaction vessel by an azeotropic distillation technique, and the product isolated by filtration. A 1% solution of the resultant copolymer had a viscosity of 4200 cps.

Example III

This example illustrates preparation of a representative copolymer falling within the area of the graph defined as Area C. The particular copolymer was comprised of 30 mole percent sodium acrylate monomer and 70 mole percent acrylamide and typifies a product used to coagulate the aqueous liquids of Group III.

27 parts by weight of acrylic acid was dissolved in 72 parts by weight of water and cooled to a temperature below 35° C. The above solution temperature was maintained while neutralization with sodium hydroxide was effected. 30 parts by weight of a 50% solution of sodium hydroxide was necessary to carry out this step. A solution pH of 7–9 was reached after neutralization.

63 parts by weight of acrylamide were then added to the above solution and mixed until dissolved at a solution temperature of 20–30° C. 33 additional parts by weight of water were added and the pH of the monomer solution adjusted to 8.5. 0.8 part of a 1% solution of potassium persulfate were added with stirring to the monomer solution. This was followed by addition of 3.2 parts of a 1% solution of sodium metabisulfite. Into the reaction vessel itself was added 575.0 parts by weight of toluene and 19.6 parts by weight of sorbitan monooleate nonionic emulsifier. To the toluene solution was added the monomer solution and the temperature increased to 75° C. The reaction vessel was purged with nitrogen and an exothermic reaction was then initiated. After the exothermic reaction had ceased, the mixture was cooled at 63° C. and additional catalyst was added. Specifically, 15.6 parts of a 1.15% solution of azobisisobutyronitrile in toluene solution was added to the reaction mixture. The nitrogen purge was continued and temperature held at 63° C. until another exothermic reaction was completed (approximately 30 minutes after initiation). After the second exothermic reaction, water was distilled off by azeotropic distillation, and the solid product isolated by filtration. A 1% solution of the final copolymeric composition had a viscosity of 22,500 cps.

Example IV

This example illustrates preparation of a typical copolymer falling within Area D of the graph. The copolymer product should be used to coagulate those aqueous liquids falling within Group IV. The product copolymer was comprised of 52 mole percent acrylamide and 48 mole percent sodium salt of acrylic acid.

A monomer solution was made as follows:
234.72 pounds of soft water was added to 4.8 pounds of acrylic acid. 28.56 pounds of a 50% solution of sodium hydroxide was then added to the acrylic acid solution while maintaining the solution temperature below 95° F. with external cooling water to prevent premature polymerization and crosslinking. When the pH of the solution reached 7–8, 27.0 pounds of acrylamide was added to the monomer solution and dissolved by heating with steam at 86° F. Finally, the pH of the monomer solution was adjusted to 8.5 with additional sodium hydroxide solution. 23.52 grams of a catalyst, t-butylhydroperoxide, was added at 86° F., and allowed to mix for 3–5 minutes. The above monomer solution was added to a reaction vessel containing 38.7 pounds of toluene and 3.2 pounds of sorbitan monooleate non-ionic emulsifier. The reaction mixture was heated to 155° F., and purged with nitrogen. At this point, an exothermic reaction was initiated at approximately a 167° F. reaction temperature. Thirty minutes after the initial exotherm the reaction was considered complete. The reaction mixture was then heated with steam to 190° F. in order to distill off water by an azeotropic technique. The reactor was then cooled, toluene stripped off, and solid copolymer removed. A 1% aqueous solution of the copolymeric product had a viscosity of 23,000 cps.

Example V

In this example, a copolymeric product was prepared which was a typical composition falling within Area E of the curve. Copolymers of this type are most efficiently utilized in coagulating liquids of Group V. The product contained 95 mole percent acrylic acid salt and 5 mole percent acrylamide.

To 17.4 pounds of water was added 11.4 pounds of acrylic acid which was then neutralized with 12.35 pounds of 50% solution sodium hydroxide until a pH of 8.3 was reached. The neutralization was carried out at a temperature below 30° C. 0.6 pound of acrylamide was then added, and the monomer solution makeup completed by addition of .276 pound of potassium persulfate and 1.1 pounds of sodium bisulfite. The monomer solution was then added to a reaction vessel containing 100 pounds of toluene and 3.4 pounds of a non-ionic emulsifier. The polymerization reaction was carried out at a temperature ranging from about 70° C., to about 100° C. At the end of the reaction, water was removed by azeotropic distillation and a solid product recovered. A 1% solution of the product had a viscosity of 30,500 cps.

The following examples illustrate the efficacy of the invention, and particularly the importance of ratio of acrylic acid salt to acrylamide in the copolymer compositions to achieve most efficient coagulation in a particular aqueous liquid being treated. It is noted, in each case, that a specific aqueous slurry or solution is most efficiently coagulated only by certain copolymers having the proper proportions of respective monomer precursors and requisite molecular weight.

Example VI

The following example is concerned with settling of a coal slurry. Table I below illustrates the fact that acceptable coagulation is carried out only with copolymeric compositions falling within Areas B, C and D. In the test, 250 milliliters of coal slurry were treated with various dosages of copolymers of varying types, and supernatant volume measured after 1.5 minutes of settling time. In addition to measurement of supernatant volume, the character of the supernatant was also visually inspected and rated for its clarity. Results are as follows:

TABLE I

| Dosage | Sodium acrylate content | | | | | | | |
|---|---|---|---|---|---|---|---|---|
| | 1% | 5% | 15% | 30% | 40% | 50% | 60% | 99% |
| .014 | 27M | | | 103sc | 73sc | 68sc | 62c | 7M |
| .014 | 20 | | | 85 | 66 | 62 | 60 | 10 |
| .028 | 78M | | | 158vc | 128vc | 96c | 90c | 8M |
| .028 | 76M | | | 148vc | | 101c | 92vc | 4M |
| .028 | 72M | 112M | 122sc | 120sc | | 172vc | | |
| .028 | 102sc | 172sc | 182sc | 182sc | | 202sc | | |

M=murky supernatant.
sc=semi-clear.
c=clear.
vc=very clear supernatant.

Example VII

In this example, suspended iron oxide fines were coagulated with various copolymers in a series of runs. Table II below sets out times required for the solids to settle to 20% of the original volume.

TABLE II

Mole percent sodium acrylate: Sec.
5 _____ 32
15 _____ 55
30 _____ 156
50 _____ 208
95 _____ 124

It can be seen from the above that iron oxide slurries are most efficiently coagulated by copolymers of the type falling within Area A.

Example VIII

Sewage waste waters were coagulated by various copolymeric compositions and floc size then determined. Results are outlined in Table III. In each case, the dosage was 0.5 p.p.m. of copolymer.

TABLE III

Sodium acrylate, percent: Floc size
1 _____ Medium small.
5 _____ Medium small.
30 _____ Medium small.
50 _____ Medium.
99 _____ Very small.

Sewage wastes are, therefore, most efficiently coagulated by copolymers falling within Area D of FIG. 1.

Example IX

In this experiment, samples of a 5% solids kaolin slurry were treated with a group of copolymers of varying sodium acrylate content, and subsequently filtered. Efficiency of coagulation was determined by comparing the time required to refilter the filtrate through the kaolin cake filter. Copolymers falling within Areas A, D and E showed superior activity in coagulating the kaolin slurries.

Example X

Settling tests were run on uranium slurries according to the method outlined in Example VI. The results are set forth below:

TABLE V

| Percent sodium Acrylate | .014 lbs./ton | .021 lbs./ton | .028 lbs./ton |
|---|---|---|---|
| 1 | 108c | 127c | 139c |
| 5 | 120sc | 138c | 147c |
| 15 | 45M | 48M | 51M |
| 30 | 38M | 38M | 38M |
| 60 | 42M | 42M | 47M |
| 99 | 71M | 81M | 86M |

The above results bear out the fact that copolymers which fall within Area A exhibit the most superior coagulation activity with respect to uranium slurries.

Example XI

Two samples of aqueous liquids containing suspended copper were treated with various copolymers. One sample was a copper slurry, while the other consisted of copper tailings. A group of copolymers comprising 1% sodium acrylate, 5% sodium acrylate, 10% sodium acrylate, 20% sodium acrylate and 30% sodium acrylate were employed in the test. With respect to both copper-containing liquids by far the best results were obtained with the 1% acrylate copolymers falling within Area A.

Example XII

In this example, a potash slurry was settled with a number of copolymers. The supernatant volumes after 10 minutes settling time in milliliter units are set forth below. Those copolymers falling within Area A exhibited the highest coagulation activity.

TABLE VI

| Dosage, p.p.m. | Sodium acrylate content | | | | | |
|---|---|---|---|---|---|---|
| | 1% | 3% | 5% | 7% | 15% | 30% |
| 100 | 66 | 73 | 32 | 8 | 53 | 6 |
| 200 | 95 | 82 | 77 | 29 | 40 | 7 |
| 200 | 90 | 105 | 30 | 48 | 57 | 37 |

Example XIII

This example demonstrates the type of copolymers which should be employed in the settling of magnesium oxide slurries. This experiment, run similar to the test procedure of Example VI, demonstrated that copolymers falling within Areas C and D should be employed to coagulate magnesia slurries. Supernatant volumes were measured after two settling times. Results are as follows:

TABLE VII

| Settling time, (min.) | Dosage, p.p.m. | Sodium acrylate content | | |
|---|---|---|---|---|
| | | 1% | 30% | 50% |
| 3 | 20 | No settling | 129M | 192sc |
| 1.5 | 40 | ____do____ | 55M | 120sc |

Example XIV

In this example, it was determined what type of copolymers are especially suited for settling of silica suspensions. In the specific runs, a 23% solids silicia suspension was coagulated with various copolymeric compositions, and at various dosage levels. Two specific types of silica suspensions were investigated, varying only in mesh size of the silica solid. The supernatant volumes after coagulant addition were measured after three minutes settling time. Results are as follows:

TABLE VIII

| Dosage (p.p.m.) | Sodium Acrylate content | | | | | | | Silica size (mesh) |
|---|---|---|---|---|---|---|---|---|
| | 3% | 5% | 7% | 15% | 30% | 40% | 50% | |
| 4 | 156 | 163 | 161 | 177 | 172 | 157 | 155 | 140 |
| 4 | 171 | 172 | 178 | 190 | 190 | 180 | 175 | 140 |
| 8 | 154 | 162 | 162 | 175 | 172 | 170 | 163 | 240 |
| 8 | 168 | 173 | 174 | 188 | 183 | 176 | 165 | 240 |

The above illustrates that silica slurries are most efficiently coagulated by copolymers falling within Areas B and C.

Example XV

In a field test, efficiency of clarification of sugar with a number of copolymers was studied. Excellent results were obtained with copolymers comprising 30% sodium acrylate and 60% sodium acrylate respectively. In a run involving use of a copolymer containing 15% sodium acrylate, non-acceptable results were achieved. In two additional runs involving use of copolymers synthesized with 1% sodium acrylate and 5% sodium acrylate respectively, very poor results were forthcoming. The above illustrates that impure sugar solutions should be treated with copolymers falling within Areas C and D.

Example XVI

In another series of tests involving sugar clarification, a 250 ml. sample of dissolved sugar was treated with various copolymers. This sugar had previously been treated with lime and phosphoric acid in order to pull down suspended impurities. The role of the coagulant is to aid in the above aim. Table IX shows again that impure sugar solutions are best coagulated with copolymers falling within Areas C and D of the graph of FIG. 1. The volume of filtrate present after one minute filtration is given below in the various runs.

TABLE IX

| Dosage, p.p.m. | Sodium acrylate content | | | | |
|---|---|---|---|---|---|
| | 1% | 5% | 15% | 30% | 60% |
| 10 | 26 | 29 | 24 | 48 | 44 |
| 10 | | | | 75 | 51 |

A great number of additional tests were run involving coagulation of all of the waters falling within Groups I through V. In each instance, it was noted that the various liquids falling within these groups should be treated with specific copolymers having requisite ratios of acrylic acid salt to acrylamide and molecular weight, as discussed above. That is, those liquids of Group I should be treated with copolymers falling within Area A of the graph. The same is true with respect to Group II and Area B, Group III and Area C, Group IV and Area D, and Group V and Area E. It was noted that if the proper copolymers were not employed, results ranged from complete ineffectiveness, that is, no improvement over a blank, to minimal coagulation, albeit unacceptable in terms of a practical efficiency.

The invention is hereby claimed as follows:

1. An improved method of flocculating solid particles suspended in an aqueous liquid whereby optimum separation of said particles from said liquids is achieved which comprises the steps of treating said specific aqueous liquids containing suspended solids defined in FIG. 2 of the drawing, as Groups I, II, III, IV and V, with specific acrylamide-acrylic acid salt copolymeric coagulant compositions defined by Areas A, B, C, D and E of the graph of FIG. 1 of the drawing whereby each respective group of aqueous liquid is treated with at least coagulating amounts of said respective copolymeric compositions in the following manner:

(A) aqueous liquids of Group I are treated with compositions consisting essentially of acrylamide-acrylic acid salt copolymeric coagulant compositions within Area A;

(B) aqueous liquids of Group II are treated with compositions consisting essentially of acrylamide-arcylic acid salt copolymeric coagulant compositions within Area B;

(C) aqueous liquids of Group III are treated with composition consisting essentially of arcylamide-acrylic acid salt copolymeric coagulant compositions within Area C;

(D) aqueous liquids of Group IV are treated with composition consisting essentially of acrylamide-acrylic acid salt copolymeric coagulant compositions within Area D; and (E) aqueous liquids of Group V are treated with compositions consisting essentially of acrylamide-acrylic acid salt copolymeric coagulant compositions within Area E.

2. The method of claim 1, whereby the aqueous liquids falling within Group I are treated with an acrylamides-acrylic acid salt copolymeric composition defined by Area A.

3. The method of claim 1, whereby the aqueous liquids falling within Group II are treated with an acrylamide-acrylic acid salt copolymer composition defined by Area B.

4. The method of claim 1, whereby the aqueous liquids falling within Group III are treated with an acrylamide-acrylic acid salt copolymer composition defined by Area C.

5. The method of claim 1, whereby the aqueous liquids falling within Group IV are treated with an acrylamide-acrylic acid salt copolymer composition defined by Area D.

6. The method of claim 1, whereby the aqueous liquids falling within Group V are treated with an acrylamide-acrylic acid salt copolymer composition defined by Area E.

References Cited

UNITED STATES PATENTS

| 2,980,609 | 4/1961 | House et al. | 210—54 |
| 3,033,782 | 5/1962 | Rauch et al. | 210—54 |
| 2,508,718 | 5/1950 | Jones. | |
| 2,830,972 | 4/1958 | Shacklett. | |
| 3,020,230 | 2/1962 | Smith | 210—54 |
| 3,055,827 | 9/1962 | Wiley | 210—53 |
| 3,079,331 | 2/1963 | Gieseke | 210—53 |
| 3,118,832 | 1/1964 | Katzer et al. | 210—54 |
| 3,128,249 | 4/1964 | Pye et al. | 210—53 |
| 3,232,793 | 2/1966 | Bourne et al. | 210—53 X |
| 3,259,569 | 7/1966 | Priesing et al. | 210—52 X |

MICHAEL E. ROGERS, Primary Examiner

U.S. Cl. X.R.

260—80, 80.3, 80.8